United States Patent
Shim et al.

(10) Patent No.: US 8,777,474 B2
(45) Date of Patent: Jul. 15, 2014

(54) OPTICAL FILM AND LIGHTING DEVICE COMPRISING THE SAME

(75) Inventors: Yong Shig Shim, Seoul (KR); Young Il Kim, Gyeonggi-do (KR); Jeong Ho Park, Seoul (KR)

(73) Assignee: LMS Co., Ltd., Gyeonggi-do (KR)

( * ) Notice: Subject to any disclaimer, the term of this patent is extended or adjusted under 35 U.S.C. 154(b) by 355 days.

(21) Appl. No.: 12/773,502

(22) Filed: May 4, 2010

(65) Prior Publication Data
US 2011/0044058 A1  Feb. 24, 2011

Related U.S. Application Data

(63) Continuation of application No. PCT/KR2008/006536, filed on Nov. 6, 2008.

(30) Foreign Application Priority Data

Nov. 6, 2007 (KR) ........................ 10-2007-0112732

(51) Int. Cl.
*F21V 7/04* (2006.01)

(52) U.S. Cl.
USPC ............ 362/620; 362/618; 362/619; 362/615

(58) Field of Classification Search
USPC ........... 362/615–619, 328, 97.4, 311.01, 330, 362/355; 349/64
See application file for complete search history.

(56) References Cited

U.S. PATENT DOCUMENTS

| | | | |
|---|---|---|---|
| 5,917,664 A * | 6/1999 | O'Neill et al. ................ 359/831 |
| 5,919,551 A | 7/1999 | Cobb, Jr. et al. | |
| 6,354,709 B1 | 3/2002 | Campbell et al. | |
| 6,417,831 B2 | 7/2002 | Kashima | |
| 6,846,098 B2 * | 1/2005 | Bourdelais et al. ............ 362/330 |
| 6,871,994 B2 * | 3/2005 | Harada et al. ................. 362/558 |
| 6,898,012 B2 * | 5/2005 | Kaminsky et al. ............. 359/599 |
| 6,900,941 B2 * | 5/2005 | Kaminsky et al. ............. 359/599 |

(Continued)

FOREIGN PATENT DOCUMENTS

| | | |
|---|---|---|
| JP | 2007-286326 | 11/2007 |
| KR | 10-2005-102299 | 10/2005 |

(Continued)

OTHER PUBLICATIONS

International Search Report in PCT/KR2008/006536, dated Mar. 31, 2009.

(Continued)

*Primary Examiner* — Jong-Suk (James) Lee
*Assistant Examiner* — Bryon T Gyllstrom
(74) *Attorney, Agent, or Firm* — Womble Carlyle

(57) ABSTRACT

An optical film is formed with a plurality of optical patterns having peak and valley portions and a lighting device may include such an optical film. Pitches of the optical patterns, heights of the peak portions and depths of the valley portions are irregular, and plan and side structures of the optical patterns have a non-linear non-symmetrical arrangement structure in which the peak and valley portions are irregularly bent. According to an optical film and a lighting device including such an optical film, a moiré phenomenon can be prevented in advance, abrasion resistance can be improved, optical defects such as scratches cannot be observed with the naked eye, a wet-out phenomenon can be prevented, and a viewing angle can be broadened.

19 Claims, 10 Drawing Sheets

(56) References Cited

U.S. PATENT DOCUMENTS

| | | |
|---|---|---|
| 7,106,517 B2 * 9/2006 | Olczak | 359/599 |
| 7,180,690 B2 * 2/2007 | Nagao | 359/837 |
| 7,717,603 B2 * 5/2010 | Kim et al. | 362/619 |
| 7,926,998 B2 * 4/2011 | Etori | 362/606 |
| 2001/0030638 A1 10/2001 | Kashima | |
| 2003/0214717 A1 * 11/2003 | Kaminsky et al. | 359/599 |
| 2003/0214718 A1 * 11/2003 | Kaminsky et al. | 359/599 |
| 2003/0214719 A1 * 11/2003 | Bourdelais et al. | 359/599 |
| 2003/0214728 A1 11/2003 | Olczak | |
| 2003/0214812 A1 * 11/2003 | Bourdelais et al. | 362/330 |
| 2005/0207035 A1 * 9/2005 | Nagao | 359/831 |
| 2005/0225865 A1 * 10/2005 | Olczak | 359/619 |
| 2005/0280752 A1 12/2005 | Kim et al. | |
| 2006/0109687 A1 5/2006 | Campbell | |
| 2006/0147152 A1 * 7/2006 | Lu et al. | 385/37 |
| 2006/0279963 A1 * 12/2006 | Kim et al. | 362/619 |
| 2007/0010594 A1 * 1/2007 | Wang et al. | 522/182 |
| 2007/0097709 A1 * 5/2007 | Hsieh | 362/620 |
| 2007/0211493 A1 * 9/2007 | Fang et al. | 362/616 |
| 2008/0117638 A1 * 5/2008 | Mai | 362/339 |

FOREIGN PATENT DOCUMENTS

| | | |
|---|---|---|
| KR | 10-2006-0020226 | 3/2006 |
| WO | WO 2005/119350 | 12/2005 |
| WO | WO 2005/119359 | 12/2005 |
| WO | WO 2007/097454 | 8/2007 |

OTHER PUBLICATIONS

Written Opinion in PCT/KR2008/006536, dated Mar. 31, 2009.
Official Action dated Nov. 6, 2012 issued in Japanese counterpart application (No. 2010-531972).
Official Action dated Nov. 28, 2013 issued in Japanese counterpart application (No. 2010-531972).

* cited by examiner

OPTICAL FILM AND LIGHTING DEVICE COMPRISING THE SAME

RELATED APPLICATIONS

This is a Continuation of PCT/KR2008/006536, filed Nov. 6, 2008, which published in English as WO 2009/061135A1 on May 14, 2009, and claims priority to KR 10-2007-0112732, filed Nov. 6, 2007. The contents of the aforementioned PCT and Korean applications are incorporated by reference.

TECHNICAL FIELD

The present invention relates to an optical film and a lighting device having the same, and more particularly, to an optical film having an improved optical property, wherein optical patterns are formed to be non-linear, non-symmetrical and irregular, so that a moiré phenomenon can be prevented, abrasion resistance can be improved, optical defects such as scratches cannot be observed with the naked eye even when they occur, a wet-out phenomenon can be prevented, and a viewing angle can be broadened, and a lighting device having the optical film.

BACKGROUND

A display device widely used in mobile phones, notebook computers, LCD monitors, flat panel TVs and the like displays images on a panel using light emitted from a backlight unit.

A backlight unit of a display device comprises a light source for emitting light, a light guide plate for allowing the light emitted from the light source to exit in the form of surface light, and at least one optical film for focusing and refracting the light exiting from the light guide plate toward a panel.

The optical film focuses and refracts the light exiting from the light guide plate to be directed toward the panel so that images having uniform luminance can be displayed on the entire region of the panel. To this end, optical patterns for focusing and refracting light are formed on a surface of the optical film. The optical film generally has a structure in which a plurality of optical patterns having a certain shape in cross section are linearly arranged at a certain pitch.

However, since such a conventional optical film has optical patterns having a certain shape in cross section and linearly arranged at a certain pitch, a moiré phenomenon may occur due to optical combination with pixel arrangement of a panel.

Meanwhile, an optical film for preventing a moiré phenomenon is disclosed in U.S. Pat. Nos. 6,354,709 and 5,919,551 and Korean Laid-open Patent Publication No 10-2007-0084410.

As shown in FIG. 1, in an optical film 1 disclosed in U.S. Pat. No. 6,354,709, a surface of the optical film is formed with optical patterns 1-1 such that peak portions thereof are non-linearly arranged. As a result, it is possible to prevent a generation of a moiré phenomenon.

As shown in FIG. 2, in an optical film 2 disclosed in U.S. Pat. No. 5,919,551, optical patterns 2-1 having irregular pitches P1, P2 and P3 are arranged on a surface of the optical film, whereby a moiré phenomenon can be prevented from occurring. At this time, peak and valley portions of the optical patterns 2-1 may have different heights t1 and t2 and different depths D1 and D2 due to the irregular pitches, respectively.

An optical film 3 disclosed in Korean Laid-open Patent Publication No. 10-2007-0084410 is shown in FIG. 3. Prism patterns 3-1 formed on a surface of the optical film 3 shown in FIG. 3 have winding shapes, whereby a moiré phenomenon is prevented from occurring.

Among these conventional optical films, in case of the optical film 1 disclosed in U.S. Pat. No. 6,354,709, valley portions of the optical patterns 1-1 are linearly arranged except that the peak portions are non-linearly arranged, and the other optical structures are regular, which include the height of the peak portion, the depth of the valley portion, an angle and the like of each optical pattern 1-1. For this reason, such regular structural elements may cause a moiréphenomenon.

Particularly, both optical surfaces (i.e., surfaces formed from a peak portion to valley portions) of each optical pattern are symmetric as the optical surfaces are close to the valley regions. Consequently, such a structure causes a moiré phenomenon.

Further, in the optical film 2 disclosed in U.S. Pat. No. 5,919,551, the optical structure in which the optical patterns 2-1 are linearly arranged causes a moiré phenomenon.

SUMMARY

Accordingly, an object of the present invention is to provide an optical film capable of preventing a moiré phenomenon in advance and a lighting device having the optical film.

Another object of the present invention is to provide an optical film, wherein abrasion resistance can be improved, optical defects such as scratches cannot be observed with the naked eye even when they occur, a wet-out phenomenon can be prevented, and a viewing angle can be broadened, and a lighting device having the optical film.

An optical film according to the present invention for achieving the objects comprises a base and a plurality of optical patterns having peak and valley portions formed on a surface of the base. Here, pitches of the optical patterns, heights of the peak portions and depths of the valley portions are irregular, and the optical patterns have a non-linear non-symmetrical arrangement structure in which the peak and valley portions are irregularly bent as viewed from top and side.

Here, a plan structure of the optical patterns preferably has a shape bent laterally zigzag along a longitudinal direction, and its bent angle is ranged from 2 to 40 degrees. Also, a side structure of the optical patterns preferably has a shape bent up and down zigzag along a longitudinal direction, and its bent angle is ranged from 3 to 30 degrees.

In addition, the optical patterns may have a defect correction structure formed as any one of a micro-irregularity, a micro-scratch and a burr, which is regularly or irregularly formed in a height region of less than 30% from an apex of the peak portion, or may have a defect correction structure, which is regularly or irregularly formed in a height region of less than 30% from an apex of the valley portion.

The optical film according to the present invention may further comprise a plurality of micro-lens patterns formed under the optical patterns to have an optical cross section of a circular arc shape.

Further, the optical film according to the present invention may further comprise a scattering structure formed on a surface opposite to the surface of the base having the optical patterns formed thereon to induce optical scattering operation on incident light.

Here, the scattering structures may be scattering patterns having optical cross sections of a partial circular arc shape, and the respective scattering patterns may have a partially spherical shape (embossing shape) in the form of a circle as projected from top and be scattered at a regular or irregular interval as viewed from top.

In addition, the optical film according to the present invention may further comprise a diffusion structure formed in the base to induce an optical diffusing operation on incident light.

Here, the diffusion structure may comprise a plurality of diffusion particles scattered in the base to induce an optical diffusion operation on incident light.

Also, the diffusion structure may be a diffusion particle layer containing diffusion particles, the base may be formed to have a laminated structure of a first optical layer and a second optical layer on which the optical patterns are formed, and the diffusion particle layer may be interposed between the first and second optical layers.

The diffusion particle may include any one of an acryl particle, a styrene particle, a silicon particle, a composite silicate, a glass bead and a diamond as a transparent solid particle, any one of titanium oxide, zinc oxide, barium sulfate, calcium carbonate, magnesium carbonate, aluminum hydroxide and clay, as a white particle, or a bubble formed in a film.

In the meantime, a lighting device according to the present invention comprises a surface light source; a panel provided over the surface light source; and the optical film according to the present invention interposed between the surface light source and the panel to focus and refract light emitted from the surface light source to the panel.

As described above, there are provided an optical film, wherein a moiré phenomenon can be prevented in advance, abrasion resistance can be improved, optical defects such as scratches cannot be observed with the naked eye even when they occur, a wet-out phenomenon can be prevented, and a viewing angle can be broadened, and a lighting device having the optical film.

DETAILED DESCRIPTION

Hereinafter, an optical film and a lighting device having the same according to the present invention will be described in detail with reference to the accompanying drawings.

Figure 1:
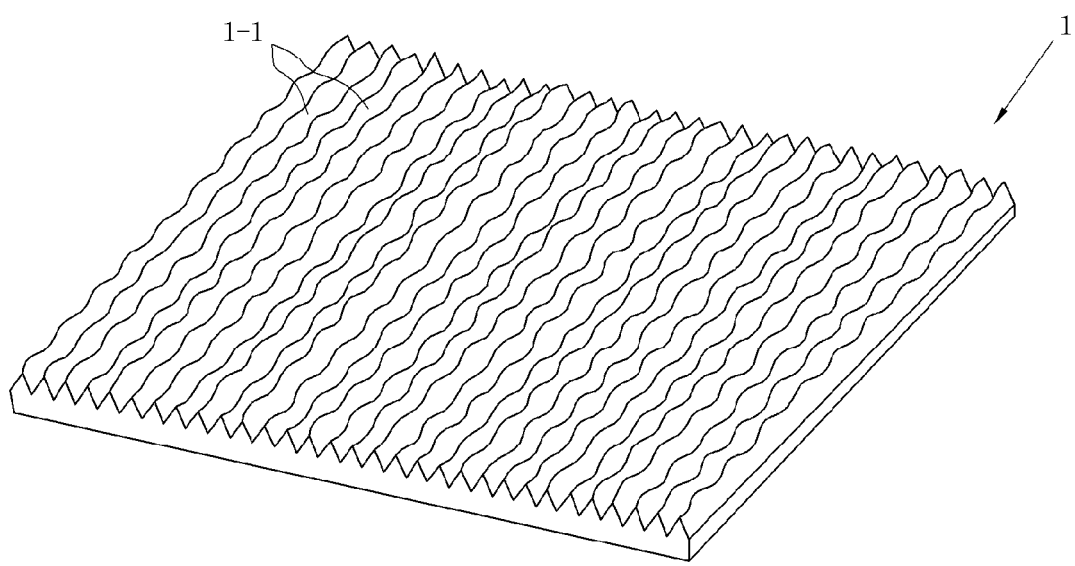
FIG. 1 is a perspective view of a general optical film.
Figure 2:
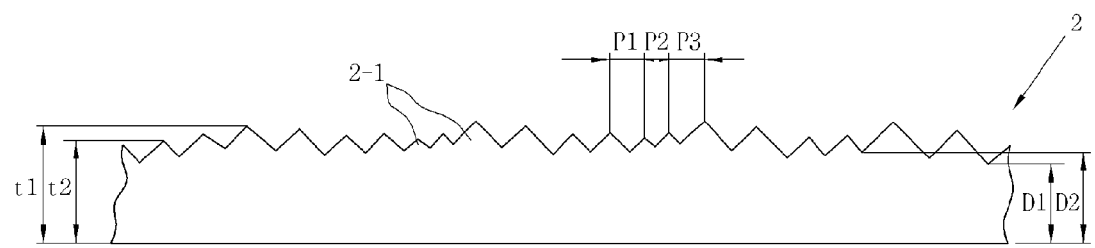
FIGS. 2 and 3 are sectional and perspective views of other general optical films, respectively.
Figure 3:
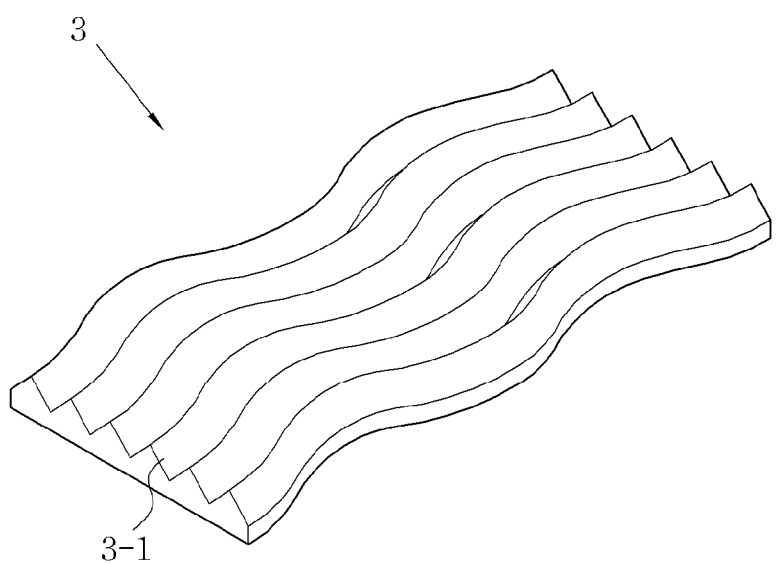
Figure 4:
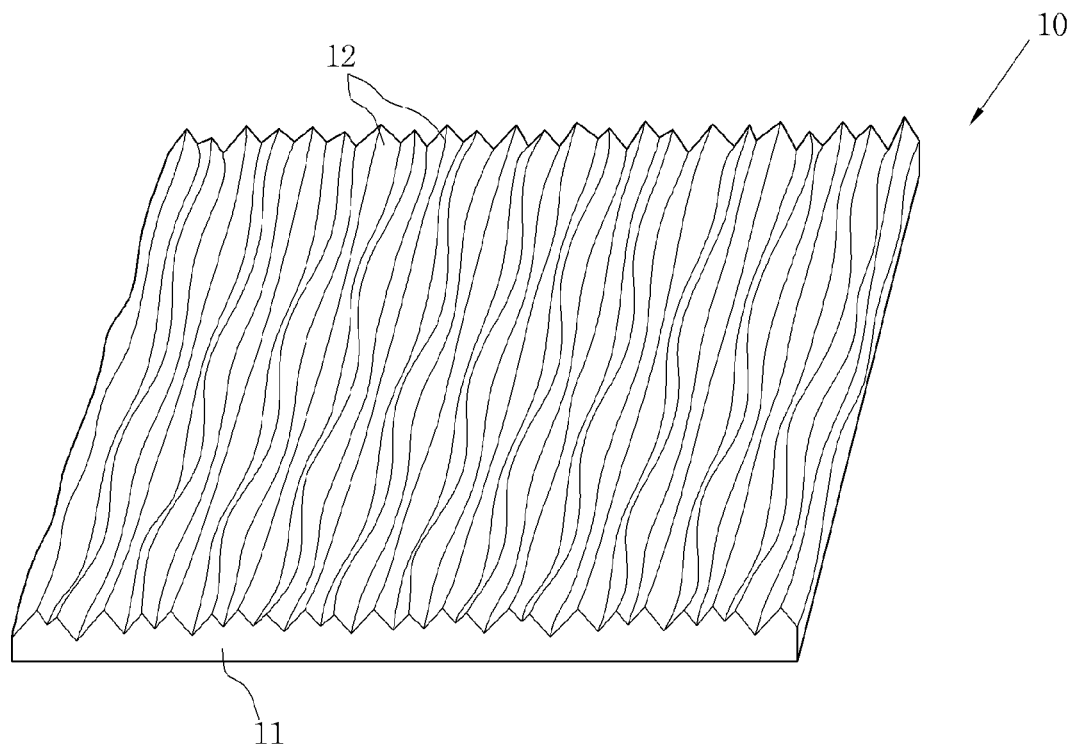
FIG. 4 is a perspective view of an optical film according to a first embodiment of the present invention.
Figure 5:
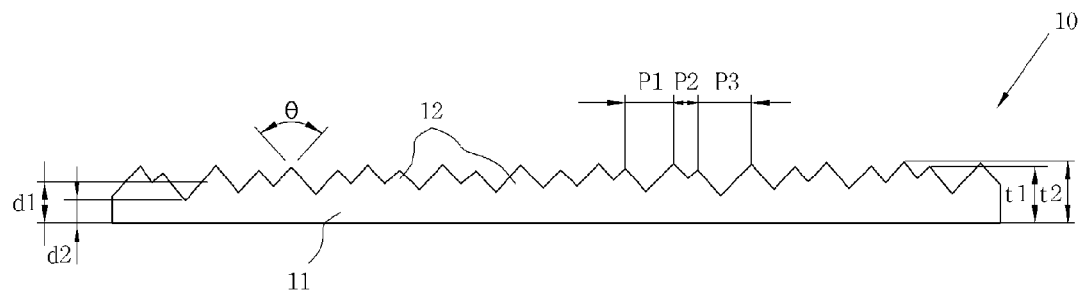
FIG. 5 is a front sectional view of the optical film shown in FIG. 4.

FIG. 4 is a perspective view of an optical film according to a first embodiment of the present invention, and FIG. 5 is a front sectional view of the optical film shown in FIG. 4.

As shown in these figures, an optical film 10 according to the first embodiment of the present invention has a structure in which at least one surface of a base 11 is formed with a plurality of optical patterns 12 that make light exit by performing a series of optical operations on incident light.

The base 11 is made of a light transmissive material through which light can be smoothly transmitted in a visible light region. For example, the base 11 may be formed of any one of polycarbonate, PVC, PP, PE, PS, PET and acrylic polymer.

The optical patterns 12 consisting of peak and valley portions may be formed integrally with the base 11 on at least one surface thereof. Alternatively, a sheet is formed of any one of materials constituting the base 11 and the optical patterns 12 are formed on a surface of the sheet, and then, the sheet may be attached to any one surface of the base 11.

At this time, the base 11 and the sheet having the optical patterns formed thereon may be formed of the same material or different materials depending on all sorts of conditions including a preparing condition of the optical film 10 and the like.

Meanwhile, the optical patterns 12 have triangular optical cross sections and are formed on a surface of the base 11 to have a structure, in which cross sectional shapes are irregular and plan and side structures are non-linear and non-symmetrical.

Here, the optical patterns 12 are formed to have irregular pitches P1, P2 and P3, and the respective optical patterns 12 are formed to have peak portions of different heights t1 and t2 and valley portions of different depths d1 and d2. Pattern angles θ each of which is defined by both surfaces of each peak portion of the optical patterns 12 are also different from each other.

FIGS. 6 to 10 are views showing various examples of plan and side structures of the optical film shown in FIG. 4. As projected from top, each of the optical patterns 12 disposed irregularly, non-linearly, and non-symmetrically may have a shape bent laterally zigzag along a lengthwise direction, wherein its bent angle θ1 may be set in a range of 2 to 40 degrees.

Further, as projected from side, each of the optical patterns 12 disposed irregularly, non-linearly, and non-symmetrically may have a shape bent up and down along a lengthwise direction, wherein its bent angle θ2 may be set in a range of 3 to 30 degrees.

Figure 6:
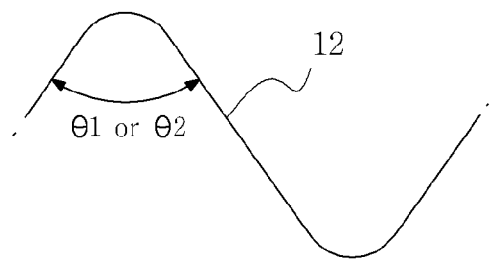
FIGS. 6 to 10 are views showing various examples of plan and side structures of the optical film shown in FIG. 4.
Figure 7:
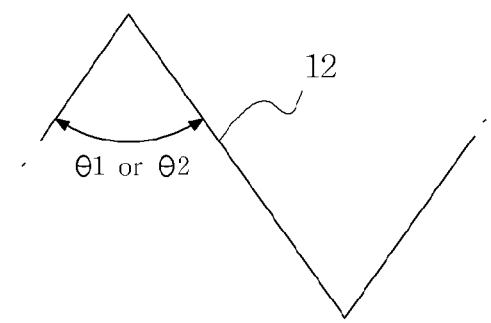
Figure 8:
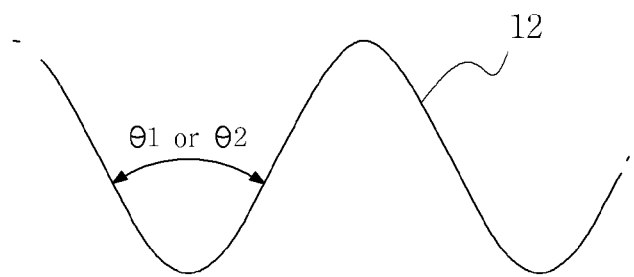
Figure 9:
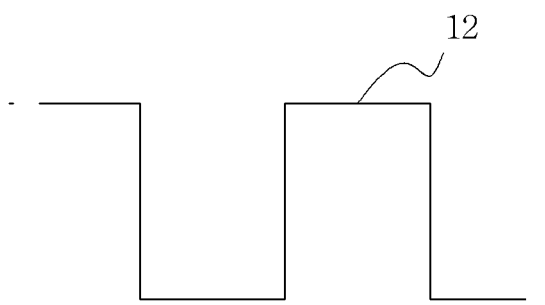

Here, in the aforementioned range of the bent angles θ1 and θ2, the side and plan structures of each of the optical patterns 12 disposed to be bent, non-linear and non-symmetrical may be any one of a sine-wave shape, a triangle-wave shape and a Gaussian-wave shape as shown in FIGS. 6 to 8, or a combined shape of at least two of these shapes.

Figure 10:
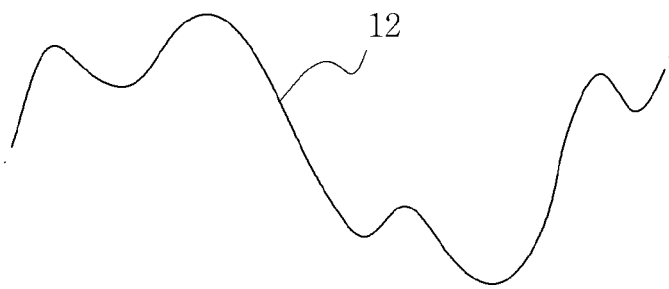

As shown in FIG. 10, each of the optical patterns 12 disposed to be non-linear and non-symmetrical may have side and plan structures of a square-wave shape.

Each of the optical patterns 12 disposed to be bent, non-linear and non-symmetrical, which has the side and plan structures of a sine-wave shape, a triangle-wave shape, a Gaussian-wave shape, a square wave and the like, may preferably have a duty cycle of 1:9 to 9:1.

The duty cycle provides a non-periodic property of the non-linear non-symmetrical arrangement structure so that a moiré phenomenon is more effectively prevented from occurring.

Such a structure of the optical patterns 12 completely excludes regular structural elements and induces optical operations such as irregular focusing and refraction of incident light, thereby scattering the light and allowing it to exit.

Accordingly, a cause of a moiré phenomenon such as a strip pattern phenomenon can be prevented in advance. Therefore, a moiré phenomenon, which is caused by combination of the optical patterns 12 and a pixel arrangement in a state where the optical film 10 and a panel of a display device are optically combined with each other, is not generated.

Further, light is formed to have a large refractive angle and diffused into a broad area by diffusion and scattering operations of the exit light, so that a viewing angle of a display device is broadened.

Furthermore, although optical defects such as scratches are generated in the optical film in a manufacturing process of the optical film or an optical combination process with other components, the optical defects are not observed with the person's naked eye due to the diffusion and scattering operations of the exit light.

Figure 11:
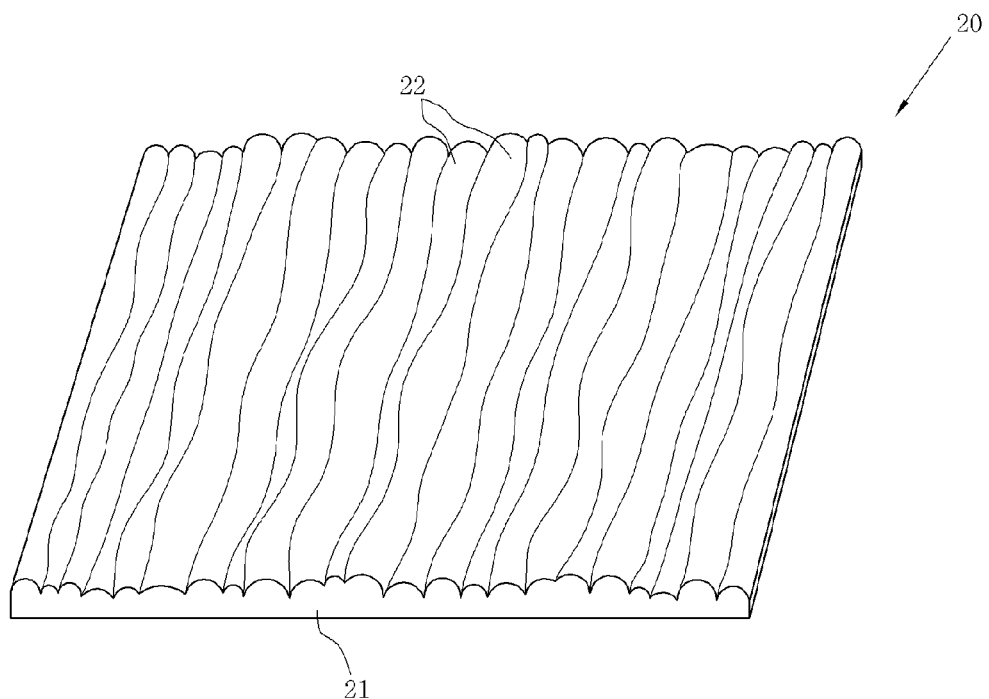
FIG. 11 is a perspective view of an optical film according to a second embodiment of the present invention.
Figure 12:
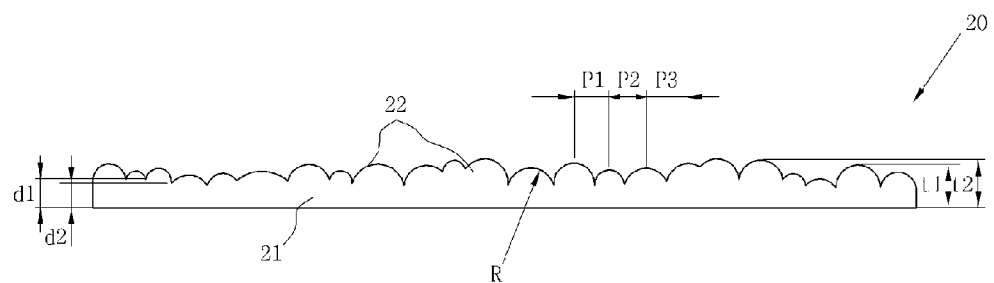
FIG. 12 is a front sectional view of the optical film shown in FIG. 11.

FIG. 11 is a perspective view of an optical film according to a second embodiment of the present invention, and FIG. 12 is a front sectional view of the optical film shown in FIG. 11.

As shown in these figures, an optical film 20 according to the second embodiment is the same as the optical film 10 according to the aforementioned first embodiment in the optical structure, including pitches between optical patterns 22, heights of peak portions, depths of valley portions, a non-linear non-symmetrical arrangement structure, and the like, except for an optical cross section of the optical patterns 22 formed on a surface of a base.

The optical patterns 22 of the optical film 20 according to this embodiment have an optical cross section of a circular arc shape. Preferably, pattern curvatures R of the optical patterns 22 are different from each other.

As in the optical film 10 according to the aforementioned first embodiment, regular structural elements of the optical patterns 22 are completely excluded, thereby preventing a moiré phenomenon from occurring. In addition, the optical cross section of a circular arc shape causes an exit angle of light to be increased, thereby broadening a viewing angle of a panel.

Further, light is focused, refracted, diffused and scattered in the optical patterns, thereby broadening a viewing angle and preventing a wet-out phenomenon, which may be generated when the optical patterns are optically combined with adjacent optical components.

Figure 13:
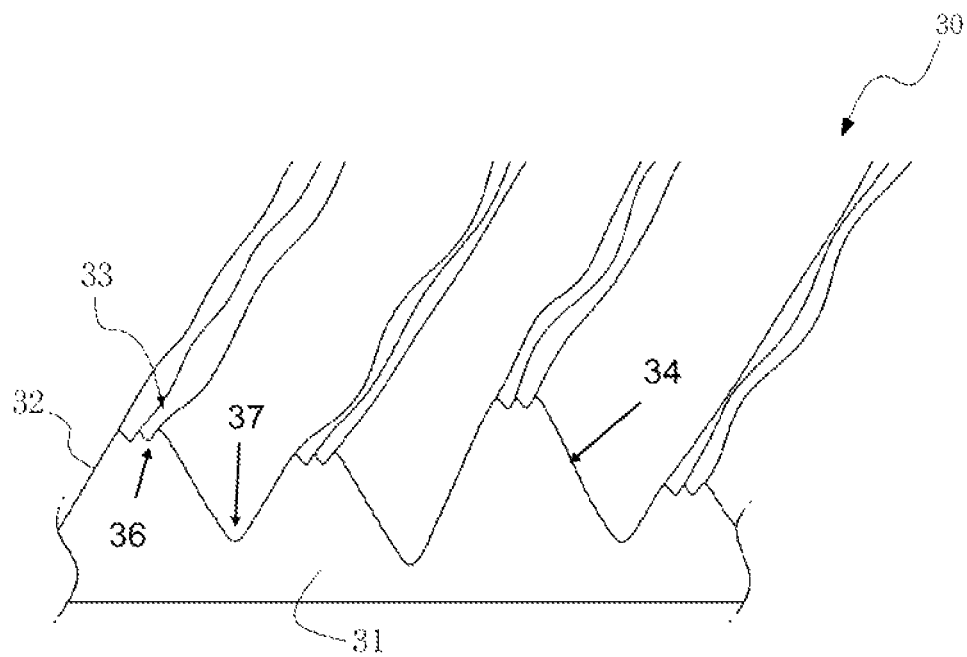
FIGS. 13 and 14 are partial perspective views of an optical film according to a third embodiment of the present invention.
Figure 14:
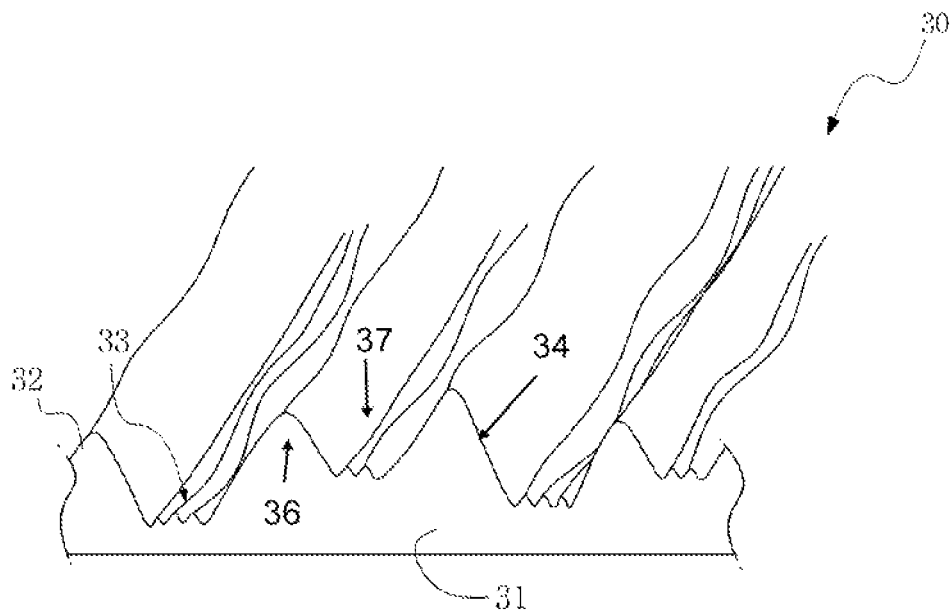

FIGS. 13 and 14 are partial perspective views of an optical film according to a third embodiment of the present invention. As shown in these figures, the optical film 30 according to the third embodiment also comprises a base 31 and a plurality of optical patterns 32 formed on a surface of the base 31.

The optical film 30 according to this embodiment is the same as the optical film 10 according to the aforementioned first embodiment in the optical structure, including pitches between the optical patterns 32, heights of peak portions, depths of valley portions, a non-linear non-symmetrical arrangement structure, and the like, except for a defect correction structures 33 formed in peak or valley portions of the optical patterns 32.

Preferably, the defect correction structures 33 formed on the optical patterns 32 of the optical film 30 according to the third embodiment are formed in regions of less than 30% from apexes of the peak portions 36 or valley portions 37. Thus, adjacent peak portions 36 and valley portions 37 are connected by sloped portions 34 which are devoid of such defect correction structures 33.

At this time, the defect correction structures 33 are to non-sharpen the apexes of the peak portions 36 or valley portions 37, and may be formed to have any one of micro-irregularities as shown in FIGS. 13 and 14, micro-scratches (not shown) and burrs (not shown), which are regularly or irregularly formed by a sand-blasting or micro-blasting process. As seen in FIGS. 13 and 14, the defect correction structures 33 themselves may take the shape of peak and valley portions.

In the optical film 30 according to this embodiment in which the defect correction structures 33 are formed on the optical patterns 32, since perimeters of the peak portions of the optical patterns 32 are formed to be unsharpened, even though the optical patterns 32 are in contact with other optical components in a preparation process of the optical film 30, a management and maintenance process, a combining process with other optical components and the like, optical defects such as scratches are not generated.

Further, although optical defects such as scratches are generated in the optical film 30, the optical defects are not observed with the person's naked eye due to diffusion and scattering operations in the irregular defect correction structures 33 of the optical patterns 32.

Furthermore, as in the optical film 10 according to the aforementioned first embodiment, regular structural elements of the optical patterns 32 are completely excluded, thereby preventing a moiré phenomenon and broadening a viewing angle.

Figure 15:
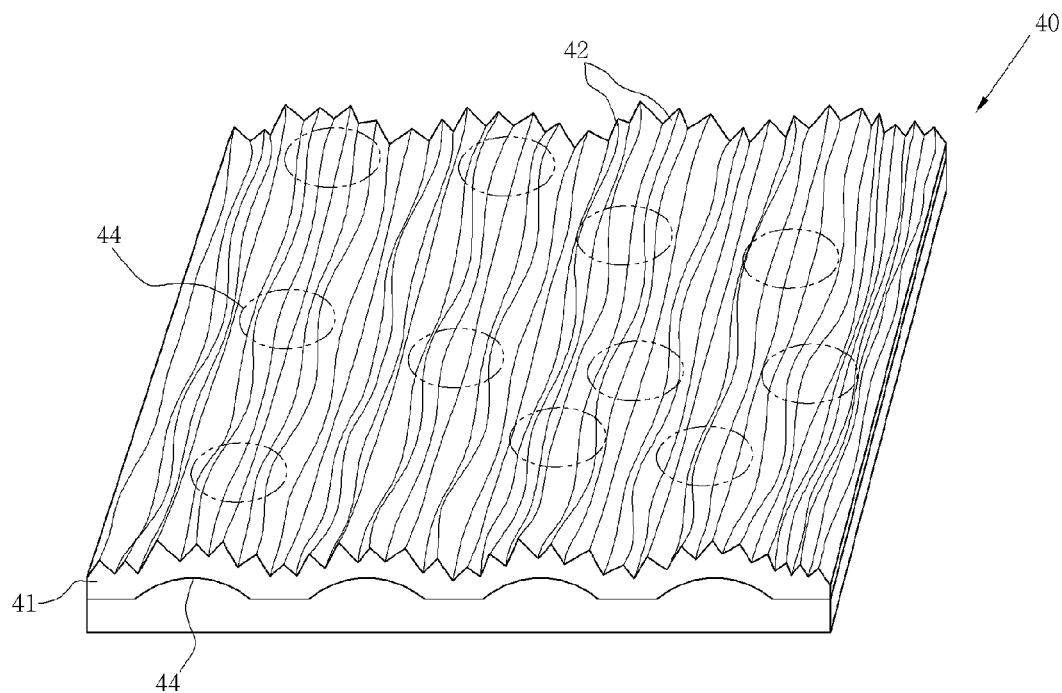
FIG. 15 is a perspective view of an optical film according to a fourth embodiment of the present invention.
Figure 16:
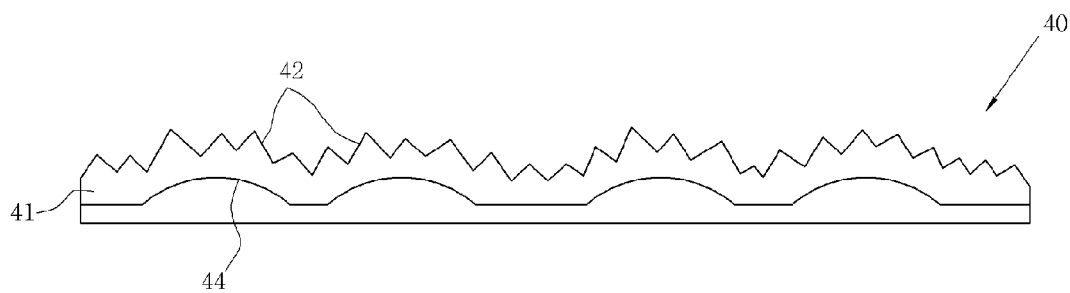
FIG. 16 is a front sectional view of the optical film shown in FIG. 15.

FIG. 15 is a perspective view of an optical film according to a fourth embodiment of the present invention, and FIG. 16 is a front sectional view of the optical film shown in FIG. 15.

As shown in these figures, an optical film 40 according to the fourth embodiment comprises a base 41 and a plurality of optical patterns 42 formed on a surface of the base 41, like the optical film 10 according to the first aforementioned embodiment. The optical film 40 according to this embodiment further comprises micro-lens patterns 44.

The micro-lens patterns 44 have a convex lens shape (embossing shape) protruding upward, i.e., a circular shape as projected from top. The micro-lens patterns 44 are distributed to be spaced apart from one another at predetermined intervals.

The micro-lens patterns 44 are formed in a lower portion of the base 41, i.e., under the optical patterns 42, and optical patterns 42 corresponding to each of the micro-lens patterns 44 protrudes in the shape of an embossment due to the convex structure of each micro-lens pattern 44.

Although not shown, the micro-lens patterns 44 may be formed in a recessed structure or a complex structure of projection and recession. The protruding radius, interval and height (depth in a recessed structure) of the micro-lens patterns 44 may be formed regularly or irregularly.

Alternatively, as projected from top, the micro-lens patterns 44 may be formed in an elliptic or polygonal shape in addition to the aforementioned circular shape, or in a complex structure of circular, elliptic and polygonal shapes.

Further, the optical patterns 42 formed over the micro-lens patterns 44 may have the shape of the optical patterns 22 of the optical film 20 according to the second embodiment, i.e., a structure in which irregular circular arc cross sections are irregularly linearly arranged.

It will be apparent that the defect correction structures 33 formed on the optical patterns 32 of the optical film 30 according to the aforementioned third embodiment may be formed on the optical patterns 42 of the optical film 40 according to this embodiment.

In the optical film 40 having the structure of the micro-lens patterns 44 and the structure of the irregular optical patterns 42, incident light is scattered by the micro-lens patterns 44 and then focused, refracted and scattered by the optical patterns 42, thereby preventing a wet-out phenomenon that may be generated when the optical patterns 42 are optically combined with adjacent optical components. As described above, a moiré phenomenon can be prevented from occurring, and a viewing angle can be broadened.

Further, scratches formed in the optical film 40 or foreign materials remaining in the optical film are not observed with the person's naked eye by scattering of light.

Figure 17:
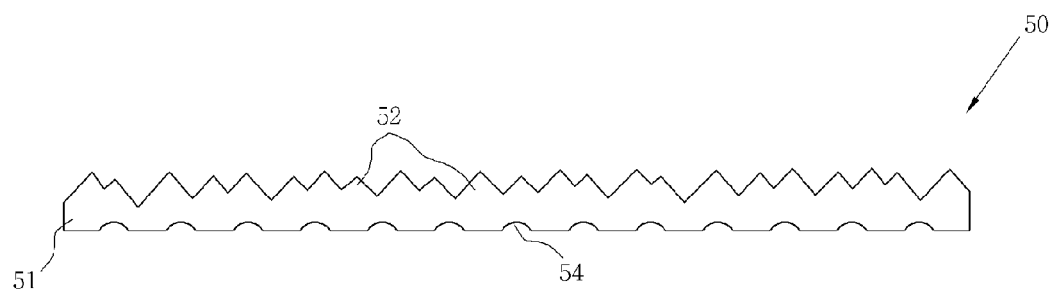
FIGS. 17 and 18 are front sectional views of an optical film according to a fifth embodiment of the present invention.

FIG. 17 is a front sectional view of an optical film according to a fifth embodiment of the present invention. As shown in this figure, an optical film 50 according to the fifth embodiment comprises a base 51 and optical patterns 52 having an irregular structure, which is similar to the optical patterns 12 formed in the optical film 10 according to the aforementioned first embodiment.

Meanwhile, the optical film 50 according to the fifth embodiment further comprises scattering patterns 54 formed on the rear of the base 51, on which the optical patterns 52 are not formed, to thereby induce an optical scattering operation on incident light.

The scattering patterns 54 are formed to have optical cross sections having partial circular arc shapes and have a partially spherical shape (embossing shape) formed in a circular shape as projected from top. As viewed from top of the base 51, the scattering patterns 54 are spaced apart from one another at regular or irregular intervals.

The scattering patterns 54 may be formed to have a structure recessed inward from the rear of the base 51 or a structure protruding outward from the base 51. It will be apparent that scattering patterns 54 having a protruding structure and scattering patterns 54 having a recessed structure may be formed together.

In addition to the aforementioned optical cross section having partial circular arc shapes, the scattering patterns 54 may be formed to have various cross sections including a triangle cross section, a polygonal cross section and the like under conditions that can allow incident light to be scattered.

Figure 18:
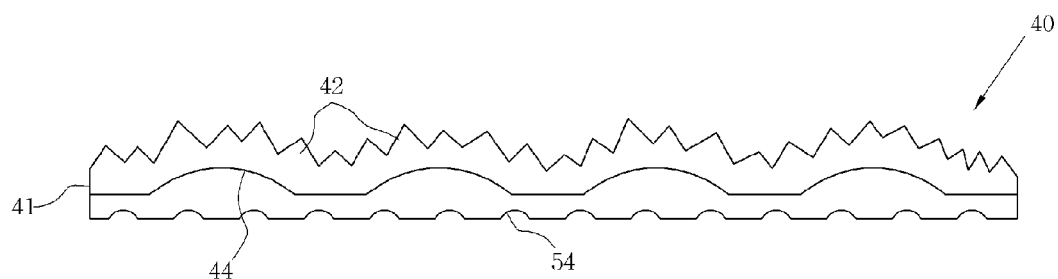

The configuration in which the scattering patterns 54 are formed on the rear of the base 51 of the optical film 50 as in the fifth embodiment may be applied to the aforementioned optical films according to the aforementioned second and third embodiments and the optical film 40 according to the fourth embodiment of the present invention (see FIG. 18).

In the optical film 50 according to the fifth embodiment having the scattering patterns 52 having such a structure, incident light is scattered by the scattering patterns 54 and then focused, refracted and scattered by the optical patterns 52, so that scratches or foreign materials in the optical film 50 are not observed with the naked eye by scattering of light. Further, a moiré phenomenon can be prevented from occurring, and a viewing angle can be broadened.

Figure 19:
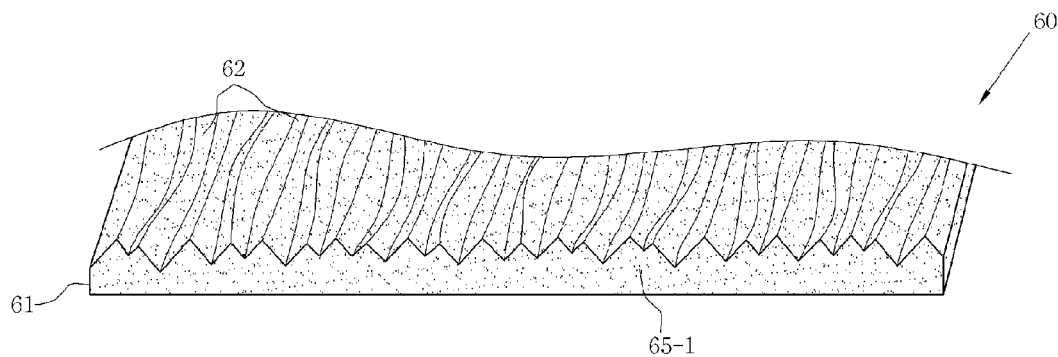
FIGS. 19 to 21 are partial perspective views of an optical film according to a sixth embodiment of the present invention.
Figure 20:
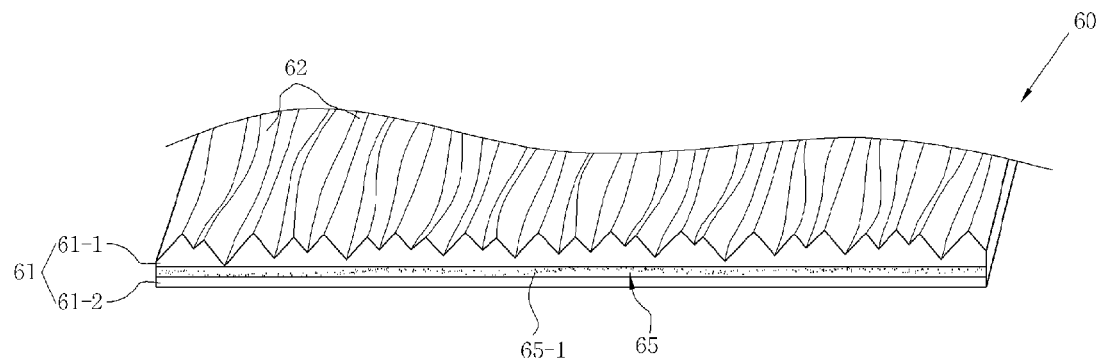
Figure 21:
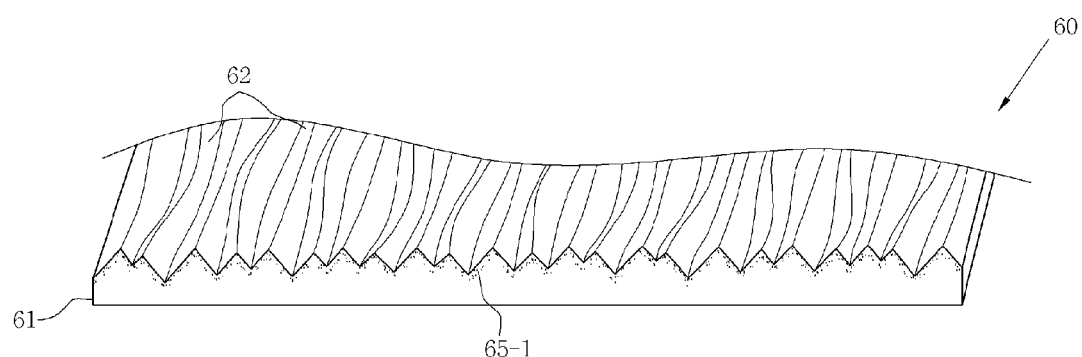

FIGS. 19 to 21 are partial perspective views of an optical film according to a sixth embodiment of the present invention. As shown in these figures, an optical film 60 according to the sixth embodiment comprises a base 61 and optical patterns 62 similar to the optical patterns 12 of the optical film 10 according to the aforementioned first embodiment.

The optical film 60 according to this embodiment further comprises diffusion structures for inducing an optical diffusion operation on incident light.

The diffusion structures may be a plurality of diffusion particles 65-1 scattered in the base 61 to induce an optical diffusion operation on incident light.

The diffusion particle 65-1 may include any one of an acryl particle, a styrene particle, a silicon particle, a composite silicate, a glass bead and a diamond, as a transparent solid particle, or may include any one of titanium oxide, zinc oxide, barium sulfate, calcium carbonate, magnesium carbonate, aluminum hydroxide and clay, as a white particle. Alternatively, the diffusion particles 65-1 may be a plurality of bubble-type air particles.

At this time, the optical film 60 is formed in a state where the diffusion particles 65-1 are contained in a raw material of the base 61, so that the diffusion particles 65-1 can be entirely scattered in the optical film 60 as shown in FIG. 19.

Alternatively, a diffusion particle layer 65 containing the diffusion particles 65-1 may be used as another diffusion structure.

As shown in FIG. 20, the base 61 of the optical film 60 is formed to have a laminated structure of a plate-shaped first optical layer 61-1 and a plate-shaped second optical layer 61-2 on which the optical patterns 62 are formed, wherein the diffusion particle layer 65 containing the diffusion particles 65-1 is interposed between the first and second optical layers 61-1 and 61-2.

At this time, the first and second optical layers 61-1 and 61-2 adhere to each other by an adhesive layer, and the diffusion particles 65-1 are scattered in the adhesive layer, so that the adhesive layer can function as the diffusion particle layer 65.

As shown in FIG. 21, the diffusion particles 65-1 are partially scattered in a region of the optical patterns 62 (preferably, in a surface region of peak and valley portions), so that diffusion of light can be induced and the structural strength of the optical patterns 62 can be reinforced.

Figure 22:
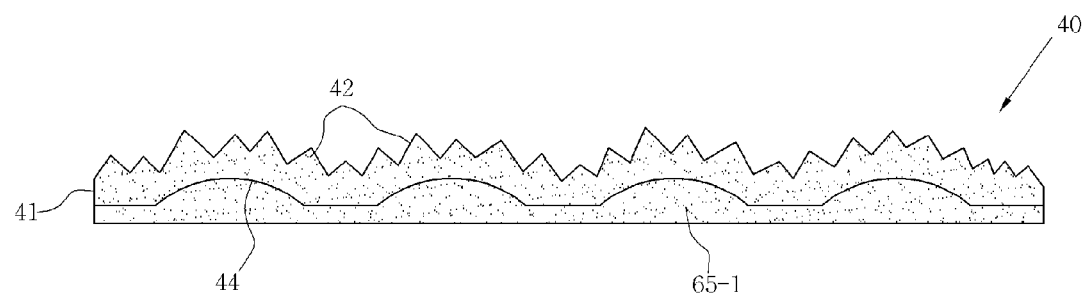
FIGS. 22 to 24 are sectional views showing other examples of the optical film according to the sixth embodiment of the present invention.
Figure 23:
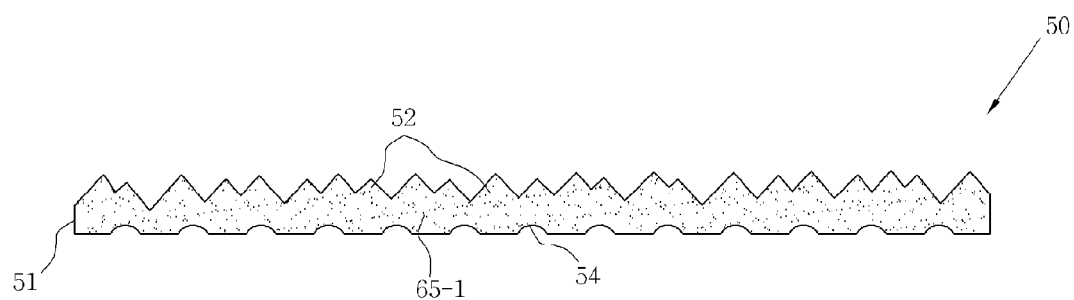
Figure 24:
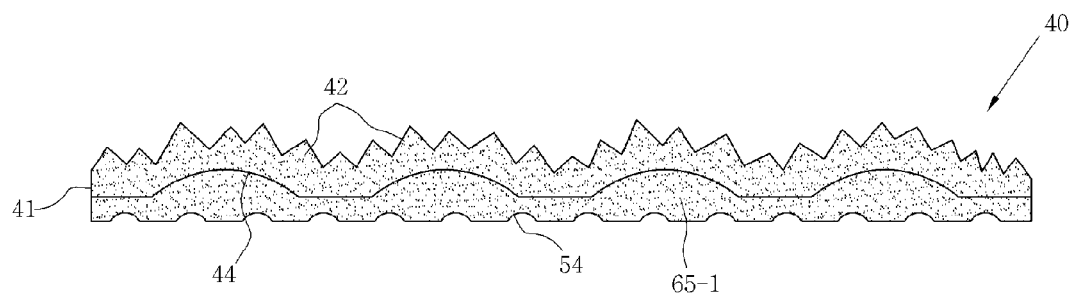

The configuration in which the diffusing particles 65-1 are scattered in the optical film 60 may be applied to the optical films (e.g., 40 of FIGS. 22 and 24 and 50 of FIG. 23) according to the aforementioned embodiments of the present invention, as shown in FIGS. 22 to 24.

In the optical film 60 according to the sixth embodiment having the diffusion particles 65-1 or the diffusion particle layer 65 and the optical patterns 62 with an irregular structure, incident light is diffused by the diffusion particles 65-1 and then focused, refracted and scattered by the optical patterns 62, so that a viewing angle can be broadened, and a moiré phenomenon can be prevented from occurring.

In addition, although optical defects such as scratches, foreign materials and stains are generated on the optical film 60 by inattention in a manufacturing process, the optical defects are not observed with the naked eyes due to the diffusion and scattering operations of light. Accordingly, workability can be improved, and a defective fraction of products can be lowered.

As such, in an optical film according to the present invention, a regular optical structure is completely excluded by irregularly forming all elements of an optical structure including a non-linear non-symmetrical arrangement structure of optical patterns, pitches between the optical patterns, heights of peak portions, depths of valley portions, and the like. Accordingly, the combination of the optical patterns and a pixel arrangement does not occur in a state where the optical film and a panel are optically combined with each other, so that a moiré phenomenon is not generated.

Further, the diffusion and scattering operations of light are induced by optical elements including an irregular structure of optical patterns, micro-lenses, scattering patterns, diffusion particles and the like, so that optical performance can be remarkably enhanced, such as a viewing angle is broadened, and optical defects are not observed.

Furthermore, due to the addition of defect correction structures to the optical patterns, there are effects in that diffusion and scattering characteristics are improved and optical defects are not observed.

Meanwhile, an optical film according to the present invention induces optical operation such as diffusion, scattering, focusing and refraction on the light incident by an irregular optical structure of optical patterns. The optical film according to the present invention can be used as various types of optical films such as a diffusing film, a light guide film, a scattering film or a focusing film. Particularly, the optical film according to the present invention can be used as an optical component in a lighting device such as a backlight unit used in a large-sized display device such as an LCD monitor or LCD TV and a small-sized display device such as an LCD monitor for notebook computers or an LCD panel for mobile phones.

As described above, the present invention can provide an optical film, wherein a moiré phenomenon can be prevented in advance, abrasion resistance can be improved, optical defects such as scratches cannot be observed with the naked eye even when they occur, a wet-out phenomenon can be prevented, and a viewing angle can be broadened.

Meanwhile, the present invention can provide a lighting device comprising the optical film according to each of the aforementioned embodiments of the present invention.

That is, the lighting device comprises a surface light source, a panel provided over the surface light source, and an optical film disposed between the surface light source and the panel to focus and refract light emitted from the surface light source onto the panel. The optical film according to each of the aforementioned embodiments is used as the optical film included in the lighting device.

The aforementioned preferred embodiments of the present invention are disclosed only for illustrative purposes. Accordingly, it will be understood by those skilled in the art that various modifications, changes and additions can be made thereto within the spirit and scope of the invention. The modifications, changes and additions will be considered to fall in the scope of the present invention defined by the appended claims.

What is claimed is:

1. An optical film comprising a base and a plurality of optical patterns having peak and valley portions formed on a surface of the base,
   wherein pitches of the optical patterns, heights of the peak portions and depths of the valley portions are irregular, and the optical patterns have a non-linear non-symmetrical arrangement structure in which the peak and valley portions are irregularly bent as viewed from top and side;
   wherein the peak portions of the optical patterns have a defect correction structure thereon, the defect correction structure itself having peak and valley portions which are formed in a height region of less than 30% from an apex of the peak portion and are irregularly bent as viewed from top and side; and
   wherein adjacent peak portions and valley portions are connected by sloped portions which are devoid of such defect correction structures.

2. The optical film as claimed in claim 1, wherein a plan structure of the optical patterns has a shape bent laterally zigzag along a longitudinal direction, and its bent angle is ranged from 2 to 40 degrees.

3. The optical film as claimed in claim 1, wherein a side structure of the optical patterns has a shape bent up and down zigzag along a longitudinal direction, and its bent angle is ranged from 3 to 30 degrees.

4. The optical film as claimed in claim 1, wherein the bent non-linear non-symmetrical arrangement structure of the optical patterns has any one of a sine-wave shape, a triangle-wave shape and a Gaussian-wave shape, or a combined shape of at least two of these shapes.

5. The optical film as claimed in claim 4, wherein the bent non-linear non-symmetrical arrangement structure of the optical patterns has a duty cycle of 1:9 to 9:1.

6. The optical film as claimed in claim 1, wherein the defect correction structure is formed as any one of a micro-irregularity, a micro-scratch and a burr, which is regularly or irregularly formed.

7. The optical film as claimed in claim 1, wherein the valley portions of the optical patterns have a defect correction structure thereon, the defect correction structure itself having peak and valley portions which are irregularly bent as viewed from top and side.

8. The optical film as claimed in claim 1, wherein the optical cross section of the optical patterns has any one of a triangle shape, a polygonal shape and a circular arc shape, and a cross sectional width of the optical patterns is regular or irregular.

9. The optical film as claimed in claim 1, further comprising a plurality of micro-lens patterns formed under the optical patterns to have an optical cross section of a circular arc shape.

10. The optical film as claimed in claim 9, wherein the micro-lens patterns have a protruding or recessed shape.

11. The optical film as claimed in claim 10, wherein a circular arc radius, an interval and a protruding height or a recessed depth of the micro-lens patterns are regular or irregular.

12. The optical film as claimed in claim 1, further comprising a scattering structure formed on a surface opposite to the surface of the base having the optical patterns formed thereon to induce optical scattering operation on incident light.

13. The optical film as claimed in claim 12, wherein the scattering structures are scattering patterns having optical cross sections of a partial circular arc shape, and the respective scattering patterns have a partially spherical shape (embossing shape) in the form of a circle as projected from top and are scattered at a regular or irregular interval as viewed from top.

14. The optical film as claimed in claim 1, further comprising a diffusion structure formed in the base to induce an optical diffusing operation on incident light.

15. The optical film as claimed in claim 14, wherein the diffusion structure comprises a plurality of diffusion particles scattered in the base to induce an optical diffusion operation on incident light.

16. The optical film as claimed in claim 15, wherein the diffusion particle includes any one of an acryl particle, a styrene particle, a silicon particle, a composite silicate, a glass bead and a diamond as a transparent solid particle, any one of titanium oxide, zinc oxide, barium sulfate, calcium carbonate, magnesium carbonate, aluminum hydroxide and clay, as a white particle, or a bubble formed in a film.

17. The optical film as claimed in claim 14, wherein the diffusion structure is a diffusion particle layer containing diffusion particles, the base is formed to have a laminated structure of a first optical layer and a second optical layer on which the optical patterns are formed, and the diffusion particle layer is interposed between the first and second optical layers.

18. The optical film as claimed in claim 17, wherein the diffusion particle includes any one of an acryl particle, a styrene particle, a silicon particle, a composite silicate, a glass bead and a diamond as a transparent solid particle, any one of titanium oxide, zinc oxide, barium sulfate, calcium carbonate, magnesium carbonate, aluminum hydroxide and clay, as a white particle, or a bubble formed in a film.

19. A lighting device, comprising:
   a surface light source;
   a panel provided over the surface light source; and
   an optical film interposed between the surface light source and the panel to focus and refract light emitted from the surface light source to the panel, wherein:
   the optical film comprises a base and a plurality of optical patterns having peak and valley portions formed on a surface of the base; and
   pitches of the optical patterns, heights of the peak portions and depths of the valley portions are irregular, and the optical patterns have a non-linear non-symmetrical arrangement structure in which the peak and valley portions are irregularly bent as viewed from top and side; and wherein:
   the peak portions of the optical patterns have a defect correction structure thereon, the defect correction structure itself having peak and valley portions which are formed in a height region of less than 30% from an apex of the peak portion and are irregularly bent as viewed from top and side; and
   wherein adjacent peak portions and valley portions are connected by sloped portions which are devoid of such defect correction structures.

* * * * *